United States Patent [19]

Starks

[11] 3,725,458
[45] Apr. 3, 1973

[54] PROCESS FOR PREPARING CYANO-COMPOUNDS

[75] Inventor: Charles M. Starks, Ponca City, Okla.

[73] Assignee: Continental Oil Company, Ponca City, Okla.

[22] Filed: Nov. 17, 1971

[21] Appl. No.: 199,769

Related U.S. Application Data

[63] Continuation-in-part of Ser. No. 10,046, Feb. 9, 1970, abandoned.

[52] U.S. Cl..........260/465.1, 260/465.3, 260/658 R, 260/663
[51] Int. Cl.............................................C07c 121/06
[58] Field of Search ..260/465.1, 465.8, 658 R, 465.3

[56] References Cited

UNITED STATES PATENTS

| 3,329,704 | 7/1967 | Goebel, Jr. et al. | 260/465.8 |
| 3,519,695 | 7/1970 | Suzuki | 260/658 R |
| 3,410,917 | 11/1968 | Louw | 260/658 R |
| 3,577,471 | 5/1971 | McNulty et al. | 260/658 R |
| 2,779,781 | 1/1957 | Copelin et al. | 260/465.8 |

OTHER PUBLICATIONS

Groggins, "Unit Processes in Organic Synthesis," Fifth Ed., (1958) pp. 259–260.

Primary Examiner—Joseph P. Brust
Attorney—Joseph C. Kotarski et al.

[57] ABSTRACT

A process for the preparation of terminally substituted cyano-compounds from 1-alkenes. The process involves the preparation of a 1-bromoalkane from the reaction of the 1-alkene and HBr in the presence of an initiator followed by a catalyzed halogen exchange reaction with HCl wherein a 1-chloroalkane is formed and HBr is regenerated. The 1-chloroalkane is then reacted with a cyanide containing compound in the presence of an organic quaternary salt catalyst to produce the desired terminally substituted cyano-compound, a 1-cyanoalkane.

6 Claims, No Drawings

PROCESS FOR PREPARING CYANO-COMPOUNDS

CROSS-REFERENCE TO RELATED APPLICATIONS

This is a continuation-in-part of my application filed Feb. 9, 1970, under U.S. Ser. No. 10,046, now abandoned, for Process For Preparing Cyano-Compounds.

BACKGROUND OF THE INVENTION

1. Field of the Invention

This invention relates to the preparation of cyano-substituted compounds. In one aspect this invention relates to the preparation of terminally substituted cyano-compounds from 1-olefins. In yet another aspect this invention relates to the preparation of terminally substituted cyano-compounds.

2. Brief Description of the Prior Art

Terminally substituted cyano-compounds have long been recognized as valuable intermediates for the preparation of carboxylic acids and amines. Various processes have been suggested in the past for the preparation of terminally substituted cyano-compounds but up to the present time such processes have been only experimental or theoretical and have not been adaptable to commercial type operations. Thus, a need has long been felt for a process in which terminally substituted cyano-compounds could be economically produced and which could readily be employed for the production of such compounds on a commercial scale.

OBJECTS OF THE INVENTION

An object of the invention is to prepare terminally substituted cyano-compounds.

Another object of the invention is to prepare terminally substituted cyano-compounds from 1-olefins.

Another object of the present invention is to provide an improved, economical process for the production of terminally substituted cyano-compounds.

These and other objects, features and advantages of the present invention will become apparent to those skilled in the art from a reading of the following detailed description and appended claims.

SUMMARY OF THE INVENTION

According to the present invention I have found a process for the preparation of terminally substituted cyano-compounds from 1-olefins. Further according to the invention I have found a process for the preparation of terminally substituted cyano-compounds wherein a 1-olefin compound is reacted with HBr in the presence of an initiator to form a 1-bromoalkane which is then reacted with HCl in a catalyzed halogen exchange reaction to form a 1-chloroalkane. The 1-chloroalkane is then reacted with a cyanide compound in the presence of an organic quaternary salt catalyst to produce the desired terminally substituted cyano-compound. The net reaction is represented by the general formula $$RCH = CH_2 + HCl + MCN \rightarrow RCH_2CH_2CN + MCl$$

DESCRIPTION OF THE PREFERRED EMBODIMENTS

The cyano-compounds prepared by the present invention are intermediates for the preparation of carboxylic acids and amines. Carboxylic acids and amines have many utilities which are well known. For example, they have found utility as jet engine lubricants, soap and detergent ingredients, or flotation agents and the like.

Basically, the reaction is a series of sequential independent reactions which must take place if one is to produce the desired terminally substituted cyano-compound. As previously stated, the net reaction can be represented by the general formula $$RCH=CH_2 + HCl + MCN \rightarrow RCH_2CH_2CN + MCl$$

wherein R is an alkyl radical having up to about 28 carbon atoms per molecule and M is an alkali metal, an alkaline earth metal, or mixtures of same.

These sequential independent reactions involve first the preparation of a 1-bromoalkane from the reaction of an 1-olefin and HBr in the presence of an initiator. The presence of the initiator is important if one is to obtain the desired 1-bormoalkane intermediate. Once the desired 1-bromoalkane intermediate has been formed it is reacted with HCl by way of a catalyzed halogen exchange reaction so that a 1-chloroalkane intermediated product is formed and HBr is regenerated. The 1-chloroalkane is then reacted with a cyanide containing compound in the presence of an organic salt catalyst to produce the desired terminally substituted cyano-compound.

The 1-olefin compounds which can be employed in the practice of the present invention and to which the cyano group is added by the reactions described above can be any suitable 1-olefin having up to about 30 carbon atoms per molecule. Examples of suitable olefins which can be employed as the 1-olefin constituent of the preparation of the terminally substituted cyano-compounds are 1-propylene, 2-ethyl-1-heptene, 1-decene, 1-dodecene, 1-pentadecene, 1-pentacosene and 1-triacontene.

As previously stated, the first intermediate reaction in the production of the terminally substituted cyano-compound is the formation of a 1-bromoalkane. In such a reaction the 1-olefin is reacted with HBr in the presence of an initiator. The presence of the initiator ensures the formation of the 1-bromoalkane, as known to the art. Without the initiator a mixture of bromoalkanes is formed. Any suitable initiator can be employed which is known to direct the addition of bromine to the 1- position. Further, the amount of the initiators employed can vary widely. However, particularly desirable results can be obtained wherein the initiator is a chemical free radical initiator and is present in an amount ranging from about 0.0001 to 1 weight percent, based on the amount of the 1-olefin. Examples of suitable initiators which can be employed to produce the 1-bromoalkane intermediate used in the process of the present invention are benzoyl peroxide, air, oxygen, hydrogen peroxide, tertbutyl hydro peroxide, di-tertbutyl hydro peroxide, 1-hydrooxycyclohexyl peroxide, U.V. light and the like.

The next step in the process of the present invention is a catalyzed halogen exchange reaction wherein the 1-bromo-alkane compound is reacted with HCl in the presence of a halogen exchange catalyst. The amount of the halogen exchange catatlyst employed can vary widely and any suitable catalyst can be employed.

However, desirable results can be obtained when the halogen exchange catalyst is present in an amount ranging from about 0.001 to 20 weight percent, based on the weight of the 1-bromoalkane constituent. While any suitable halogen exchange catalyst can be employed, desirable results can be obtained wherein the catalyst is selected from the group consisting of organic quaternary salts, charcoal, urea, thiourea, imidazole and imidazole derivatives.

The organic quaternary salt which can be employed as the halogen exchange catalyst can be any suitable organic quaternary salt catalyst having the general formula

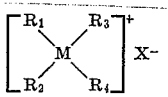

wherein M. is a pentavalent ion of an element selected from the group consisting of nitrogen, phosphorous, arsenic, antimony and bismuth, $R_1$, $R_2$, $R_3$, and $R_4$ are alkyl groups containing from one to about 30 carbon atoms, and X is a conventional anion derived from an organic or inorganic acid; including halides, sulfates, sulfonates and acetates. Normally, it is desirable that the alkyl substituents $R_1$, $R_2$, $R_3$, and $R_4$ contain more than a single carbon atom. Examples of suitable organic quaternary salts which can be employed as the catalyst in the process of the present invention are: hexadecyltrihexylammonium bromide; trioctylethylammonium bromide; tridecylmethylammonium chloride; didodecyldimethylammonium chloride; tetraheptylammonium iodide; dioctadecyldimethyl ammonium chloride; tributyldecylphosphonium iodide; tributylhexadecylphosphonium iodide; tricaprylyldodecylammonium p-toluene sulfonate; tetranonylammonium hydroxide; 1-methyl-1-(N-octadecanonyl-2-aminoethyl)-2-heptadecyl-4,5-dihydro-1,3-diazole methylsulfonate.

The 1-chloroalkane so produced is then reacted with a cyanide containing compound in the presence of an effective amount of an organic quaternary salt catalyst having the general formula

wherein $R_1$, $R_2$, $R_3$, $R_4$, M' and X are as previously described. While the amount of the catalyst employed can vary widely, generally the catalyst is present in an amount from about 0.01 to 10 weight percent based on the weight of the 1-chloro compound.

In order to more fully understand the process of the present invention and the results of the before described net reaction the process conditions for such a reaction by way of the series of reactions which are involved will now be discussed in detail.

The cyanide containing compound which is employed in the before-mentioned reaction can be any suitable cyanide compound having the formula MCN wherein M is an alkali metal, an alkaline earth metal, or mixtures containing both alkali metal cyanide compounds and alkaline earth metal cyanide compounds. Examples of suitable alkali metal compounds which can be employed as the M constituent are calcium, magnesium, strontium, and barium. While any of the alkali metals or alkaline earth metals can be employed as the metal constituent of the cyanide substituted compound especially desirable results have been obtained where sodium is employed as the metal constituent.

In carrying out the process for the production of terminally sutstituted cyano-compounds the desired 1-olefin compound is contacted with from about 1:1 to 4:1 mole ratio of HBr to produce a 1-bromoalkane. This reaction is represented by the general formula

While the reaction conditions of equation 1 can vary widely generally the reaction is generally carried out at a temperature within the range of about 0° C to 150° C at autogenous pressures.

The formation of the 1-chloroalkane from the 1-bromo-alkane is carried out by way of a halogen exchange reaction in the presence of an effective amount of a halogen exchange catalyst. In carrying out this step of the process the 1-bromoalkane is contacted with from about 1:1 to 1 to 100 mole ratio of HCl at a temperature in the range of about 100° to 250° C and at a pressure ranging from atmospheric pressure to about 2,000 psig. Preferably, the bromo compound and HCl are present in a mole ratio of about 1:10. Thus, the net reaction is represented by the general formula

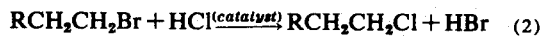

The HBr so formed, and the unreacted HCl are then separated from the 1-chloroalkane by any suitable means well known in the art. Further, the separated product 1-chloroalkane may be contacted a second time with a similar amount of HCl to ensure substantially complete formation of the 1-chloroalkane. The separated HCl-HBr mixture so recovered can be employed in the reaction of equation 1 to form the desired bromo compound from the 1-olefin since the olefin will react preferentially with the HBr.

The catalyst employed in this halogen exchange reaction can be any suitable catalyst which will assist such an exchange. Further, the amount of such catalysts can vary widely but will generally be within the range of from about 0.001 to 20 weight percent, based on the amount of the 1-bromoalkane. As previously discussed, desirable results can be obtained when the halogen exchange catalyst is an organic quaternary salt, charcoal, urea, thiourea, imidazole or imidazole derivatives.

Once the 1-chloroalkane intermediate product has been recovered it is then reacted with a cyanide containing compound in the presence of an effective amount of an organic quaternary salt catalyst to produce the desired terminally substituted cyano-compound. The organic quaternary salt catalysts which can be employed have the general formula

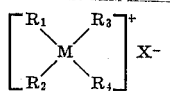

wherein each of the constituents, namely $R_1$, $R_2$, $R_3$, $R_4$, M' and X are as previously described.

While the amount of catalyst employed can vary widely generally the catalyst is present in an amount of from about 0.01 to 10 weight percent based on the weight of the 1-chloro compound. This reaction is represented by the general formula $$RCH_2CH_2Cl + MCN \xrightarrow{quat.} RCH_2CH_2CN + MCl \quad (3)$$

The reaction described in equation 3 above is a two-phase reaction and the organic quaternary salt catalyst functions as a phase transfer agent, thus allowing an efficient and effective formation of the terminally substituted cyano-compound. The reaction conditions employed in equation 3 can vary widely but generally the reaction is conducted at autogenous pressures and a temperature of from about 50° to 200° C. Desirable results have been obtained wherein the reaction is carried out at a temperature within the range of about 100° to 150° C. The amount of alkali or alkaline earth metal cyanide salt in aqueous medium employed can vary widely but is generally present in an amount of from about 0.5 to 4 moles of the aqueous cyanide salt solution to 1 mole of the alkyl chloride compound. Desirable results have been obtained wherein the ratio of alkyl chloride compound to the aqueous cyanide salt solution is about 1:1. In addition, the amount of cyanide salt present in the aqueous medium can vary widely but is normally a saturated solution.

The three reactions disclosed above (i.e. equations 1, 2 and 3) illustrate the formation of the terminally substituted cyano-compounds of the present invention. While the metal constituent of the cyanide salt can be any suitable alkali or alkali metal, desirable results have been obtained wherein the cyanide salt is sodium cyanide. Likewise, the organic quaternary salt compound employed and described hereinbefore can vary widely. However, I have found especially desirable results have been obtained wherein the cyanide salt is sodium cyanide. Likewise, the organic quaternary salt compound employed and described hereinbefore can vary widely. However, I have found especially desirable results have been obtained wherein the organic quaternary salt catalyst is an ammonium or phosphonium salt.

In order to more fully describe the present invention the following example is set forth. However, it is to be understood that the example is for illustrative purposes only and is not intended to limit the scope of the present invention which will be defined in the appended claims. In the example all parts are by weight unless otherwise indicated.

EXAMPLE

Reaction of HBr with 1-Olefins

The preparation of 1-bromo compounds from the corresponding 1-olefin in the presence of free radical initiators was demonstrated by bubbling gaseous hydrogen bromide into the liquid olefin at 25°–60° C. In the case of 1-butene both 1-butene and hydrogen bromide were bubbled into preformed 1-bromobutane. The reactions were continued until at least 94 percent if the olefin had reacted. Reaction products were then washed with water, aqueous sodium carbonate solution, and then again with water. The products were analyzed by gas chromatography with the results shown in Table I.

TABLE I

| Initiator | Olefin | Moles Initiator per Mole Olefin | % Selectivity to 1-Bromo alkane |
|---|---|---|---|
| Benzoyl peroxide | 1-octene | 0.01 | 98.6 |
| Benzoyl peroxide | 1-octene | 0.005 | 96.3 |
| Benzoyl peroxide | 1-octene | 0.001 | 93.7 |
| Benzoyl peroxide | 1-octene | 0.007 | 98.0 |
| Air | 1-octene | * | 91 |
| Ultraviolet light | 1-octene | | 95.3 |
| Di-t-butyl peroxide | 1-decene | 0.005 | 97.2 |
| Di-t-butyl peroxide | 1-hylene | 0.005 | 96.9 |
| Di-t-butyl peroxide | 1-octadecene | 0.005 | 93.4 |
| t-Butyl hydroperoxide | 1-Butene | 0.005 | 98.5 |

* Air (25 ml) was bubbled into reaction mixture during the the reaction

Reaction of 1-Bromoalkanes with Hydrogen Chloride

A. Quaternary Salt Catalyst

A mixture of 17 g. 1-bromo octane and 1 g. of tributyl octadecylphosphonin bromide was charged to a 100 ml autoclave. The autoclave was purged with anhydrous hydrogen chloride gas, and then pressured to 600 psig with HCl. The autoclave was heated to 151°–160° C for 1 hour, cooled, and vented. The liquid product was washed with 5 percent aqueous sodium hydroxide solution and dried over sodium sulfate. Analysis of the liquid product by gas chromatography showed that 84.7 percent of the 1-bromo octane had been converted to 1-chloro octane. When this mixture was again treated in the autoclave with fresh HCl (600 psig) the 1-chloro octane content of the liquid mixture exceed 97 percent.

B. With Charcoal and Other Solids

A stream containing 61.7 g./hour of 1-bromobutane and 160 g./hour of anhydrous hydrogen chloride was passed over a bed of activated charcoal (200 ml., 60–80 mesh) at 200°–625° C. The product mixture was condensed into a liquid nitrogen trap. Hydrogen chloride was fractionally distilled from the product. The residue was analyzed by gas chromatography and was found to consist of 93 percent 1-chloro-butane and 7 percent 1-bromobutane.

This experiment was successfully repeated using alumina, titania, and silica as catalysts.

Hydrogen bromide as obtained from these reactions, mixed with the excess and unreacted hydrogen chloride, can be used to react with more olefin, without separation of the HCl.

Reaction of 1-Chloroalkanes with Sodium Cyanide

In the following experiments 1-chloroalkanes were treated with aqueous sodium cyanide solutions (saturated with NaCN) at 100° C. in the presence of several quaternary salt catalysts. The reaction was followed by periodic sampling of the organic phase and analysis by gas chromatography.

| Chloroalkane | Catalyst (conc)* | Field of Cyano alkane |
|---|---|---|
| 1-Chlorooctane | tridecyl ammonium chloride 5% | 99.5 |
| 1-Chlorooctane | tributyl hexadecyl phosphonium chloride (3) | 99. |
| 1-Chlorodecane | tributyl hexadecyl phosphonium chloride (3) | 99. |
| 1-Chlorooctane | "oleophilic ion exchange resin"* | 95. |
| 1-Chlorodecane | "oleophilic ion exchange resin"* | 97. |

*The quaternary salt catalyst concentrations was based percent of 1-chlorooctane. The oleophilic ion exchange resin was prepared by treating trioctylamine with chloromethylated cross-linked polystyrene resin.

The above data clearly indicates the preparation of terminally substituted cyano-compounds according to the process of the present invention. In addition it is evident that certain starting materials, such as HBr, can be recovered for use in the overall process for the preparation of terminally substituted cyano-compounds from 1-olefins. Further, while the above example has depicted certain purifying and washing steps of the intermediate products in the formation of the desired terminally substituted cyano-compounds, it is to be understood that such washing and purifying steps relate solely to the purity of the end product and not to the formation of the product produced by the process of the present invention.

Having thus described the present invention, I claim:

1. A process for preparing a terminally substituted cyano-compound from a 1-alkene which comprises the sequential steps of:
   a. reacting the 1-alkene having the general formula $RCH=CH_2$ wherein R is an alkyl group containing up to about 28 carbon atoms with HBr in a molar ratio of about 1:1 to 4:1 in the presence of an effective amount of a free radical initiator at a temperature of from about 0°C to 150°C to produce a 1-bromoalkane;
   b. reacting said 1-bromoalkane with from about 1:1 to 1:100 mole ratio of HCl in the presence of an effective amount of a halogen exchange catalyst selected from the group consisting of charcoal, urea, thiourea, imidazole, and organic quaternary salt compounds having the general formula:

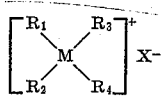

wherein M' is a pentavalent ion of an element selected from the group consisting of nitrogen, phosphorous, arsenic, antimony, and bismuth; wherein $R_1$, $R_2$, $R_3$, and $R_4$ are alkyl groups containing from one to 30 carbon atoms; and wherein X is a halide, sulfate, a sulfonate, acetate, or hydroxide at a temperature of from about 100° to 250°C and a pressure of from about atmospheric to about 2,000 psig in a reaction environment characterized by the substantial complete absence of an added solvent to form a 1-chloroalkane;
   c. reacting said 1-chloroalkane with an alkali or alkaline earth metal cyanide salt in aqueous medium in a molar ratio of about 1:0.5 to 1:4 at a temperature in the range of about 50° to 200°C in the presence of from about 0.01 to 10 weight percent, based on the weight of the 1-chloroalkane, of an organic quaternary salt catalyst having the general formula

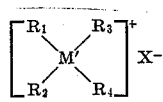

wherein M' is a pentavalent ion of an element selected from the group consisting of nitrogen, phosphorous, arsenic, antimony, and bismuth, wherein $R_1$, $R_2$, $R_3$, and $R_4$ are alkyl groups containing from one to about 30 carbon atoms, and wherein X is selected from the group consisting of halides, sulfate, sulfonates, acetate, and hydroxide; or an organic quaternary salt catalyst which is an oleophilic ion exchange resin prepared by treating trioctylamine with chloromethylated cross-linked polystyrene resin; for a period of time effective to replace the chlorine constituent of the 1-chloroalkane with the cyanide constituent of the metal cyanide salt; and
   d. recovering from the reaction mixture of step (c) the terminally substituted cyano-compound which is a 1-cyanoalkane.

2. The process according to claim 1 wherein said 1-chloroalkane and said aqueous solution of an alkali or alkaline earth metal cyanide salt are present in a molar ratio of about 1:1 and said reaction is carried out at a temperature within the range of about 100° to 150°C.

3. The process of claim 2 which includes the following purification steps:
   a. washing the 1-bromoalkane sequentially with water, an aqueous sodium carbonate solution, and water to purify the 1-bromoalkane prior to reacting said with HCl; and washing the 1-chloroalkane with an aqueous solution containing 5 weight percent sodium hydroxide and drying the washed product over sodium sulfate prior to contacting same with said aqueous solution of an alkali or alkaline earth metal cyanide salt to produce the desired 1-cyanoalkane.

4. The process according to claim 3 wherein said M' of said organic quaternary salt catalyst is selected from the group consisting of nitrogen and phosphorous.

5. The process according to claim 4 wherein said cyanide containing salt is sodium cyanide.

6. A process for preparing a 1-cyanoalkane from a 1-alkene having four to 18 carbon atoms per molecule which comprises the sequential steps of:
   a. reacting the 1-alkene in the presence of an effective amount of a free radical initiator selected from the group consisting of benzoyl peroxide, air, ultraviolet light, di-t-butyl peroxide, and t-butyl hydroperoxide at a temperature of about 25° to 60°C to produce a 1-bromoalkane;
   b. reacting said 1-bromoalkane with 1 to 100 moles of HCl per mole of 1-bromoalkane in the presence of an amount of tributyloctydecylphosphonium bromide sufficient to effect halogen exchange at a temperature of 100°C to 250°C and a pressure of from about atmospheric to about 2,000 psig in a reaction environment characterized by the substantial complete absence of any added solvent to form a 1-chloroalkane having four to 14 carbon atoms per molecule;
   c. reacting said 1-chloroalkane with sodium cyanide in aqueous medium in a molar ratio of about 1:0.5 to 1:4 at a temperature in the range of about 50° to 200°C in the presence of 0.01 to 10 weight percent, based on the weight of the 1-chloroalkane, of an organic quaternary salt catalyst selected from the group consisting of tridecylammonium chloride, tributylhexadecylphosphonium chloride, and an oleophilic ion exchange resin prepared by treating trioctylamine with chloromethylated cross-linked polystyrene resin to replace the chlorine constituent of the 1-chloroalkane with the cyanide constituent of the sodium cyanide; and
   d. recovering from the reaction mixture of step (c) the 1-cyanoalkane.

* * * * *